United States Patent [19]

Montet

[11] Patent Number: 4,635,174

[45] Date of Patent: Jan. 6, 1987

[54] UNIVERSAL PROTECTIVE CAP FOR MOTOR VEHICLE HEADLAMPS

[75] Inventor: Maurice Montet, Bagnolet, France

[73] Assignee: Cibie Projecteurs, France

[21] Appl. No.: 749,297

[22] Filed: Jun. 27, 1985

[30] Foreign Application Priority Data

Jun. 27, 1984 [FR] France .................. 84 10151

[51] Int. Cl.⁴ .............................................. F21V 31/02
[52] U.S. Cl. ................................. 362/457; 339/59 L; 339/60 R; 339/61 L; 339/206 L; 362/61
[58] Field of Search .................. 362/61, 80, 226, 368, 362/457; 174/54, 61; 215/317; 220/306; 339/59 L, 60 R, 61 L, 206 R, 206 L; 403/345, 375

[56] References Cited

U.S. PATENT DOCUMENTS

| 1,933,358 | 10/1933 | Almcrantz | 174/61 X |
| 4,250,540 | 2/1981 | Kristofek | 362/368 |
| 4,471,414 | 9/1984 | Savage, Jr. | 362/226 |

FOREIGN PATENT DOCUMENTS

| 2405603 | 8/1975 | Fed. Rep. of Germany | 362/226 |
| 2436334 | 4/1980 | France . | |
| 2487950 | 2/1982 | France . | |
| 16228 | 2/1898 | Switzerland | 362/457 |
| 2031576A | 4/1980 | United Kingdom . | |

Primary Examiner—Samuel Scott
Assistant Examiner—Allen J. Flanigan
Attorney, Agent, or Firm—McCormick, Paulding & Huber

[57] ABSTRACT

The present invention relates to a protective cap for a motor vehicle headlamp and is intended to be mounted on the rear of a reflector (100) incorporated in the headlamp. The cap comprises an enveloping sleeve (20) which has inwardly projecting fastening means (21, 22) for co-operating with a rim (111) on the headlamp. The sleeve also has a flexible sealing lip (30) which rests, in use, against the reflector. According to the invention, the fastening means are arranged in a plurality of levels of generally annular structures projecting from the inside face of the sleeve and axially spaced along said inside face (23). In addition, the sealing lip is suitable for withstanding deformation including a radial component which is of the same order of magnitude as the axial separation between two adjacent levels of the projecting structures, while still providing proper sealing for the rear surface of the reflector (100).

12 Claims, 2 Drawing Figures

UNIVERSAL PROTECTIVE CAP FOR MOTOR VEHICLE HEADLAMPS

The present invention relates to protective caps for motor vehicle headlamps, and more particularly to the protective caps used to protect the center rear portion of motor vehicle headlamps.

In the following description, the term "headlamp" is used to designate any type of optical system including a reflector or mirror, e.g. a parabolic reflector, which co-operates with a light source which is generally disposed on the axis of the reflector (and usually close to a focus thereof).

BACKGROUND OF THE INVENTION

The present invention relates more precisely to protective caps for motor vehicle headlamps, which caps are intended to be mounted on the back of a reflector incorporated in the headlamp. Such a cap comprises a sleeve having inwardly projecting means for engaging a rim on the headlamp, and also having a flexible peripheral sealing lip which rests, in use, on the reflector. The above-mentioned projector rim is preferably formed on a bulb-carrier which is fixed to the reflector, but in a variant it may be formed, for example, by fins projecting outwardly from the base of the bulb, as is the case for H4 type bulbs.

Protective caps of the above-mentioned type comprising a sleeve fitted both with fastening means and with a flexible lip are described, in particular, in French published patent application Nos. 2 053 608, 2 056 516, 2 071 808, and 2 436 334, and reference can usefully be made to these prior specifications in order to fully understand the present invention.

Generally speaking, these caps are formed by means of a single-piece hood made of synthetic rubber which is fixed by means of the above-mentioned fastening means against the end of the optical block of a motor vehicle headlamp in order to cover that portion of the reflector on which the bulb is mounted, with the free peripheral edge of the hood being applied, to this end, against the rear surface of the reflector.

Such caps serve firstly to provide a general protective function, and secondly, and above all, to provide water-tightness, i.e. to stop rainwater from running along the reflector and into the opening in which the bulb is engaged. These caps also have the function of protecting the electrical connections which supply electricity to said bulb, and also of protecting the inside of the reflector.

The Applicant has observed, that depending on the function and/or the focal length of the reflectors, the anchor structures (generally a rim on a bulb-carrier) provided on the projector to co-operate with the fastening means disposed on the inside surface of the enveloping protective sleeve of the cap are situated at different distances from the rear surface of the reflector.

As a result, manufacturers have hitherto been constrained to provide a specific model of cap which is compatible with each new application or new type of headlamp.

As a result there are problems of design, problems of providing special manufacturing facilities, and a non-negligible inconvenience in storing a large number of different types of cap.

In order to remedy the above drawbacks, an attempt could naturally be made to use the same model of cap for various types of headlamp. However, the Applicant has observed that given the conventional structure of such caps, such a solution is not entirely satisfactory, in particular when it comes to providing watertightness.

In order to solve these prior difficulties, the applicant has set out to design a universal water tight cap capable of replacing the numerous prior art models.

SUMMARY OF THE INVENTION

A protective cap in accordance with the present invention comprising an enveloping sleeve which has inwardly projecting fastening means for co-operating with a projector rim and which is provided with a flexible peripheral sealing rim for resting, in use, against the reflector incorporated in the headlamp, includes the improvements whereby the fastening means comprise a plurality of axially spaced levels of generally annular structures projecting inwardly from the inside face of the sleeve, and whereby the sealing lip generally outwardly flared in shape and is suitable for withstanding deformation in the direction of greater flaring such that the radial component of said deformation is of the same order of magnitude as the axial difference which exists between two adjacent levels of the projecting structures, while still ensuring adequate watertightness around the rear surface of the reflector.

The choice of level in the fastening means used to anchor the protective cap on the rear of a headlamp optical block, and consequently the fastening depth, is determined as a function of the distance between the anchoring rim provided on the projector and the rear surface of the reflector, with the sealing lip in accordance with the present invention enabling both secure fixing of the cap onto the projector and proper watertightness by virtue of its specified properties for any intermediate distance between the above-mentioned rim of the projector and the reflector in the range extending between two levels of the anchor means.

Preferably, the projecting structures are suitable for fastening to the rim of a bulb-carrier fixed to the reflector.

Advantageously, in a manner explained below, the term "radial component of deformation of the same order of magnitude as the axial distance between two adjacent levels of the projecting structures" is used to designate a radial component lying in the range 0.4 to 0.9 times the axial distance between two adjacent levels of the projecting structures.

In a particular embodiment of the invention, two levels of projecting structures are provided on the inside surface of the sleeve.

Advantageously, each level of the projecting structures comprises a plurality of ribs which are generally distributed around a common internal circumference of the sleeve and each covering a limited sector of said circumference.

The above-mentioned projecting ribs are preferably offset angularly relative to one another from one level to another.

In a particular embodiment of the invention, each level of the projecting structures comprises four ribs each of which covers an angular sector of about 45°.

Advantageously, the enveloping sleeve is provided at its opposite end to the sealing lip with a transverse base wall having an orifice and fitted with secondary sealing means.

In a first variant of the invention, the transverse base wall of the sleeve is suitable for receiving, in sealed manner, an angled tubular part serving as a duct for electrical connections to a bulb integrated in the headlamp.

In a second variant the transversal base wall of the sleeve is fitted with a generally cylindrical skirt having a flexible secondary lip intended to rest against the base of a bulb integrated in the headlamp. Where applicable, such a cylindrical skirt may be integral with the sleeve or else it may be fixed thereto by interfitting projections.

Advantageously the sleeve and the lip associated therewith are made as a one-piece molding of synthetic elastomer whose hardness lies between 50 and 60 on the Shore A scale.

BRIEF DESCRIPTION OF THE DRAWINGS

An embodiment of the invention is described by way of example with reference to the accompanying drawings, in which.

MORE DETAILED DESCRIPTION

Figure 1:
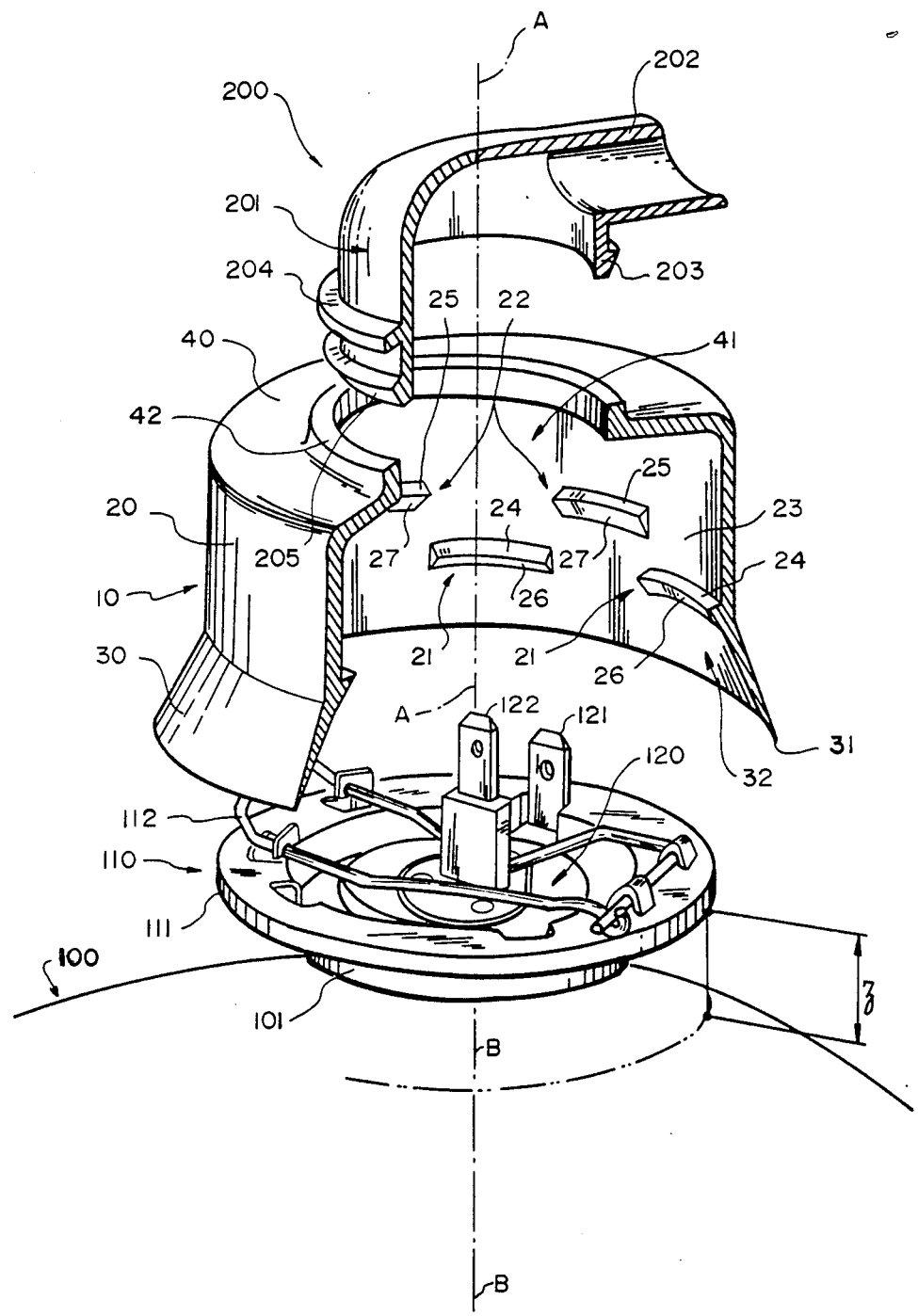
FIG. 1 is a partially exploded and partially cut away general perspective view of a protective cap in accordance with the present invention.

FIG. 1 shows a protective cap 10 in accordance with the invention for mounting on the back of a reflector having a general reference 100.

More precisely, the protective cap 10 whose structure is described in greater detail below is adapted to be mounted on the annular rim 111 of a bulb-carrier 110 fixed in conventional manner to the cylindrical collar 101 of the reflector.

As already indicated above, the axial distance z between the rim 111 of the bulb-carrier and the reflector 100 varies from one type of headlamp to another.

FIG. 1 also shows contact tabs 121 and 122 for a bulb 120 which is fixed to the bulb-carrier 110 by means of a clamp 112.

The structure of the reflector 100 and of the bulb-carrier 110 is conventional and is not described in greater detail below.

As can be seen in FIG. 1, the protective cap 10 comprises a sleeve 20 which is a body of revolution about an axis A—A which, in use, is coaxial with the axis B—B of the reflector 100.

One end of the cylindrical sleeve 20 is provided with a generally frusto-conical lip 30 which is symmetrical about the above-mentioned axis A—A. More precisely, the lip 30 is flared away from the cylindrical sleeve 20. Further, as shown in FIG. 1, the thickness of the lip 30 tapers away from the cylindrical sleeve 20 from a relatively thick base where the lip meets the cylinder 20 towards a relatively thin forward free edge 31.

The other end of the cylindrical sleeve 20 is fitted with a transverse base wall 40, i.e. a wall which is perpendicular to the axis A—A. This base wall 40 is fitted with a central cylindrical orifice 41. Therefore the base wall 40 is in the form of a radially extending annular ring.

It may also be observed that the periphery of the orifice 41 has an outwardly directed axially projecting flange 42 of rectangular right cross-section.

Further, as mentioned above, a plurality of levels of projecting structures are provided on the inside face of the cylindrical sleeve 20. Said levels of structures are spaced apart in the axial direction.

More precisely, as can be seen in FIG. 1, there is a first series of projecting ribs 21 disposed substantially around a common inside circumference of the sleeve adjacent to the zone where the cylindrical sleeve 20 meets the sealing lip 30 and there is a second series of projecting structures 22 disposed around a second common inside circumference of the sleeve which is axially offset into the cylindrical sleeve 20 relative to the preceding inside circumference.

More precisely, in the embodiment shown in FIG. 1, each series of structures as mentioned above comprises four ribs 21 or 22 each of which occupies an angular sector of about 45° around the inside peripheral surface 23 of the cylindrical sleeve 20.

This particular arrangement should not be considered as being limiting.

First, for example, the projecting structures could extend around 360° and thus completely cover a corresponding inside circumference of the above-mentioned peripheral surface 23.

Further, the number of series or levels of projecting structures provided on the inside periphery 23 of the sleeve 20 is not limiting.

When the ribs 21 and 22 only cover a limited portion of the corresponding inside circumference of the sleeve, the projecting ribs 21 and 22 are preferably offset angularly relative to one another from one level to the next, as shown in FIG. 1.

Figure 2:
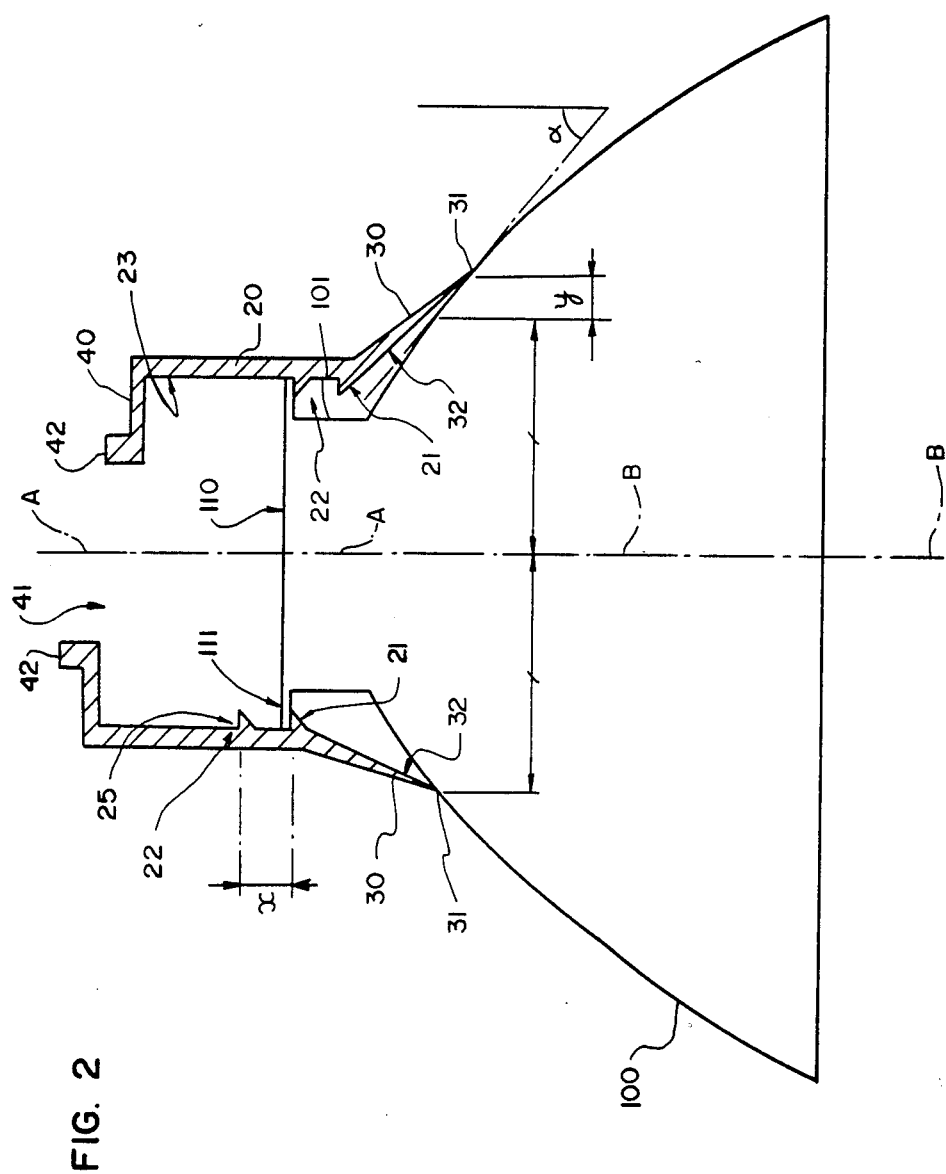
FIG. 2 is a diagrammatic view of said protective cap in section, serving to illustrate the operation thereof, with the right-hand and left-hand halves of FIG. 2 respectively showing the positions taken up by the protective cap when anchored on two different levels of the fastening means.

As shown diagrammatically in FIG. 2, the projecting ribs 21, 22 are intended to engage the rim 111 of the bulb-carrier 110. More precisely, the radially extending surface of the ribs 21 or 22 facing the base wall 40 is intended to latch against the surface of the rim 111 of the bulb-carrier 110 which faces the reflector 110, as can be seen in FIG. 2.

In order to facilitate such engagement, the projecting ribs 21, 22 project inside the outside diameter of the rim 111, thereby requiring resilient deformation of the cap material. The ribs 21, 22 preferably have a triangular right cross-section so as to present a sloping camming or wedging surface capable of being pushed past the rim 111 when the cap is put into position.

More precisely, the ribs 21 and 22 are delimited firstly by a rear surface 24, 25 which extends radially (i.e. perpendicularly to axis A—A) which rear surface 24, 25 is intended to rest against the rim 111 of the bulb-carrier 110 in use, as shown in FIG. 2, and secondly by a camming surface 26, 27 which slopes relative to the axis A—A and which is circularly symmetrical about said axis.

More precisely, the camming surfaces 26, 27 are suitable for facilitating engagement of the ribs 21, 22 with the rim 111 of the bulb-carrier 110 by flaring away from the axis A—A towards the sealing lip 30.

As shown in FIG. 2, the cap 10 is engaged on the headlamp in such a manner that when one of the fastening ribs 21 or 22 has moved beyond the rim 111 of bulb-carrier 110, and rests against the surface thereof which faces the reflector 100, the free edge 31 of the sealing lip 30 or a generally frusto-conical portion of the inside peripheral surface 32 thereof (in the regions furthest from the cylindrical sleeve 20) rests against the rear surface of the reflector 100 in order to provide watertightness or sealing between the cap and the reflector.

The left-hand side of FIG. 2 shows a sealing cap 10 anchored to the bulb-carrier 110 by means of the ribs 21 which are closest to the sealing lip 30, whereas the right-hand side of FIG. 2 shows the same sealing cap 10 anchored to the bulb-carrier 10 by means of the second ribs 22 which are located further inside.

An examination of FIG. 2 shows that the free edge 31 of the sealing lip 30 which slides over the rear surface of the reflector 100 as it flares away from the bulb-carrier 110, must be capable of withstanding deformation tending to increase the flare of the lip as the anchor point moves from the outermost ribs 21 (left-hand side of FIG. 2) to the innermost ribs 22 (right-hand half of FIG. 2) in order to provide continuous sealing between the protective cap and the reflector 100.

More precisely, the above-mentioned deformation of the sealing lip must include a radial component y (defined as being the displacement in a radial direction relative to the axis A—A for each of the points on the free edge 31 of the lip 30) which is of the same order of magnitude as the axial distance x existing between two adjacent levels of projecting structures 21, 22.

Yet more precisely, the radial component y should lie in the range of about 0.4 to about 0.9 times the axial distance between two adjacent levels of the projecting structures 21 and 22.

The above-mentioned relationship between the radial component y of the deformation of the sealing lip and the axial distance x existing between two adjacent levels of the projecting structures is determined on the basis of the equation $y = x \tan \alpha$, where the angle $\alpha$ represents the inclination of the average tangent to the rear surface of the reflector 100 relative to the axis A—A at its point of contact with the sealing lip 30. It should be observed, that given the conventional geometry of reflectors used for motor vehicle headlamps, the above-mentioned angle $\alpha$ generally lies in the range 30° to 60°.

The above reasoning relating to FIG. 2 and concerning anchoring using two different levels of projections in conjunction with the rim 111 of a bulb-carrier 110 disposed at a constant distance from the reflector 100 is equivalently applicable to analyzing the characteristics which the sealing lip 30 must satisfy in order to enable the protective cap 10 to be fastened on two different bulb-carriers 110 whose distances from their corresponding reflectors 100 differ by an amplitude x, and naturally, the same reasoning applies to the entire range of axial distances covered by said amplitude x.

Thus, by using a sealing lip which satisfies the above equation and by disposing fastening projections on the inside surfaces of the sleeve to cover an axial difference equal to the possible range of variation in the height z of the bulb-carrier rim (i.e. the distance between the rim and the reflector) it is possible to obtain a universal protective cap.

As shown in FIG. 1 the transverse base wall 40 of the cap 10 is also preferably adapted to receive, in sealed manner, an angled tubular part serving as a duct for the electrical connections to a bulb integrated in the headlamp.

Such a part 200 is particularly suitable for H1 type bulbs.

In the embodiment shown in FIG. 1, the part 200 comprises a bowl 201 having a tubular extension 202 which is transverse thereto.

In use, the cylindrical bowl 201 is coaxial with the axis A—A.

The free rim of the bowl 201 is intended to be mounted on the flange 42 surrounding the orifice 41 in the base wall 40 of the cap. In order to do this, the bowl 201 is provided on its outside peripheral surfaces with a first annular rib 203 which is axially displaced therefrom away from the free edge of the bowl 201.

The axial distance between the two ribs 203 and 204 is substantially equal to the thickness of the flange measured in the axial direction (i.e. parallel to the axis A—A) such that after the rib 203 has been inserted into the orifice 41 the two ribs 203 and 204 are disposed on either side of the flange 42 and hold the bowl 201 in place, thereby holding the part 200 to the protective cap 10 while providing sealing between said components.

Preferably, as shown in FIG. 1, the outside peripheral surface 205 of the first rib 203 tapers towards the axis of symmetry of the bowl 201 towards the free edge thereof in order to facilitate engaging said rib 203 in the above-mentioned orifice 41.

Naturally, the part 200 may be made in numerous different variants.

Further, the part 200 described above may be replaced by a generally cylindrical skirt disposed on the transverse base wall 40 and having a secondary flexible lip intended to rest against the base of a bulb integrated in the headlamp.

Such a flexible skirt is particularly adapted for use with a headlamp having H4 type bulbs.

In a first variant embodiment, said flexible skirt may be integral with the side surface of the transverse base wall 40 (extending coaxially with the axis A—A towards the sealing lip 30).

In a second embodiment, said flexible skirt may be constituted by an independent part which is fixed to the flange 42 by means of ribs similar to the ribs 203 and 204 as described above.

In a particular embodiment of the present invention given by way of non-limiting example, the protective cap (and more precisely the cylindrical sleeve 20, the sealing lip 30 and the transverse base wall 40) are constituted by a one-piece molding of synthetic elastomer whose hardness on the Shore A scale lies in the range 50 to 60, and is preferably 55.

Further, in this particular embodiment given by way of non-limiting example, the cap may be made from 100EPDM type elastomer (where EPDM stands for an ethylene/propylene/diene copolymer) and:

the cylindrical sleeve 20 is about 30 mm long in the axial direction;

the cylindrical sleeve 20 has a wall thickness of about 3 mm;

two series of four ribs 21, 22, each occupying an angular sector of about 45° are provided on the inside peripheral surface 23 of the cylindrical sleeve 20;

the axial distance between the two series of ribs is about 8 mm;

the length of the sealing rib is about 16 mm;

the thickness of the sealing lip diminishes progressively from a position adjacent to the cylindrical sleeve 20 towards the free edge of the lip; and the concical shape of the sealing lip 16 is such that the inside diameter of the cylindrical sleeve 20 is about 62 mm, and the diameter of the free edge 31 of the sealing lip 30 is about 80 mm.

It may be observed that it is desirable for the cylindrical sleeve to be thick enough to avoid axial deformation thereof in use such that axial stress applied to the cap by its being anchored to a bulb-carrier results in resilient deformation of the sealing lip only.

I claim:

1. A protective cap for a motor vehicle headlamp, said cap being for mounting on the rear of a reflector incorporated in said headlamp and being of the type comprising an enveloping sleeve which includes inwardly-directed projecting fastening means for co-operating with a rim on the headlamp, and a peripheral flexible sealing lip which rests, in use, against said reflector, the cap including the improvements whereby:

said fastening means include a plurality of axially-spaced levels of generally annular structures projecting from the inside face of the sleeve; and said sealing lip is generally flared in shape towards its free edge and is adapted to withstand deformation tending to increase the flare thereof such that the radial component (y) of said deformation is of the same order of magnitude as the axial separation (x) existing between two adjacent levels of said projecting structures, while still providing proper sealing against the rear surface of said reflector.

2. A protective cap according to claim 1, wherein said projecting structures are adapted to latch onto the rim of a bulb-carrier which is fixed to said reflector.

3. A protective cap according to claim 1, wherein the sealing lip is adapted to withstand deformation such that the radial component of the deformation (y) lies between 0.4 and 0.9 times the axial separation (x) between two adjacent levels of said projecting structures.

4. A protective cap according to claim 1, wherein said cap has two levels of projecting structures on the inside surface of its sleeve.

5. A protective cap according to claim 1, wherein each level of projecting structures comprises a plurality of ribs which are generally distributed around a common inside circumference of the sleeve and each of which covers a limited sector of said circumference.

6. A protective cap according to claim 5, wherein the projecting ribs are angluarly offset relative to one another from one level to the next.

7. A protective cap according to claim 5, wherein each level of projecting structures comprises four ribs each of which occupies an angular sector of about 45°.

8. A protective cap according to claim 1, wherein the enveloping sleeve is provided at its end opposite to the sealing lip with a transverse base wall having an orifice and equipped with secondary sealing means.

9. A protective cap according to claim 8, wherein the transverse base wall of the sleeve is adapted to receive in sealed manner an angled tubular part serving as a duct for electrical connections for a bulb integrated in said headlamp.

10. A protective cap according to claim 8, wherein the transverse base wall of the sleeve is equipped with a generally cylindrical sleeve having a flexible second lip intended to rest against the base of the bulb integrated in said headlamp.

11. A protective cap according to claim 1, wherein the enveloping sleeve and the sealing lip associated therewith are made by means of a one-piece molding of synthetic elastomer whose hardness lies between 50 and 60 on the Shore A scale.

12. A protective cap according to claim 6, wherein each level of projecting structures comprises four ribs each of which occupies an angular sector of about 45°.

* * * * *